United States Patent
Nieminen et al.

(10) Patent No.: US 6,409,798 B1
(45) Date of Patent: Jun. 25, 2002

(54) PROCESS FOR RECOVERING METAL MATERIAL FROM WASTE MATERIAL

(75) Inventors: Jorma Nieminen; Juha Palonen; Markku Itäpelto, all of Varkaus; Pekka Harkki, Helsinki; Lauri Mäkipaja, Varkaus, all of (FI)

(73) Assignee: Foster Wheeler Energia Oy, Helsinki (FI)

(*) Notice: Subject to any disclaimer, the term of this patent is extended or adjusted under 35 U.S.C. 154(b) by 0 days.

(21) Appl. No.: 09/762,718
(22) PCT Filed: Aug. 12, 1999
(86) PCT No.: PCT/FI99/00667
§ 371 (c)(1), (2), (4) Date: Mar. 13, 2001
(87) PCT Pub. No.: WO00/09770
PCT Pub. Date: Feb. 24, 2000
(51) Int. Cl.$^7$ ................................................ C22B 21/00
(52) U.S. Cl. ...................................................... 75/403
(58) Field of Search ........................................... 75/403

(56) References Cited

U.S. PATENT DOCUMENTS

| | | | |
|---|---|---|---|
| 5,342,428 A | * | 8/1994 | Cook et al. ............ 75/403 |
| 5,364,443 A | * | 11/1994 | Tremblay et al. ...... 75/403 |
| 5,667,556 A | | 9/1997 | Orth et al. ............. 75/450 |

FOREIGN PATENT DOCUMENTS

| | | |
|---|---|---|
| EP | 0 239 227 | 7/1990 |
| EP | 0 741 192 | 3/1996 |
| EP | 10-81885 | 3/1998 |
| WO | WO 93/23579 | 11/1993 |
| WO | WO 87/05052 | 8/1997 |
| WO | WO 99/32673 | 7/1999 |

* cited by examiner

Primary Examiner—Melvyn Andrews
(74) Attorney, Agent, or Firm—Fitzpatrick, Cella, Harper & Scinto

(57) ABSTRACT

A process for recovering metal material from waste material including organic material and metal material in the form of thin foil metal material. The process includes steps of introducing the waste material into a fluidized bed gasifier, introducing air through a bottom grid into the gasifier for fluidizing a bed of solid particles, for gasification of the organic material therein, and production of a combustible gas, discharging separately from the gasifier bottom ash and combustible gas produced in the gasification step, maintaining the temperature in the gasifier below the melting temperature of the metal material, tearing the thin foil metal material into small metal flakes in the fluidized bed, setting the velocity of the air in the fluidized bed such that the metal flakes are entrained with the produced combustible gas, but the not-gasified waste material and the bed particles stay in the bed, discharging the metal flakes from the gasifier together with the combustible gas and introducing the combustible gas discharged from the gasifier into a separator, for separating metal material from the combustible gas.

22 Claims, 1 Drawing Sheet

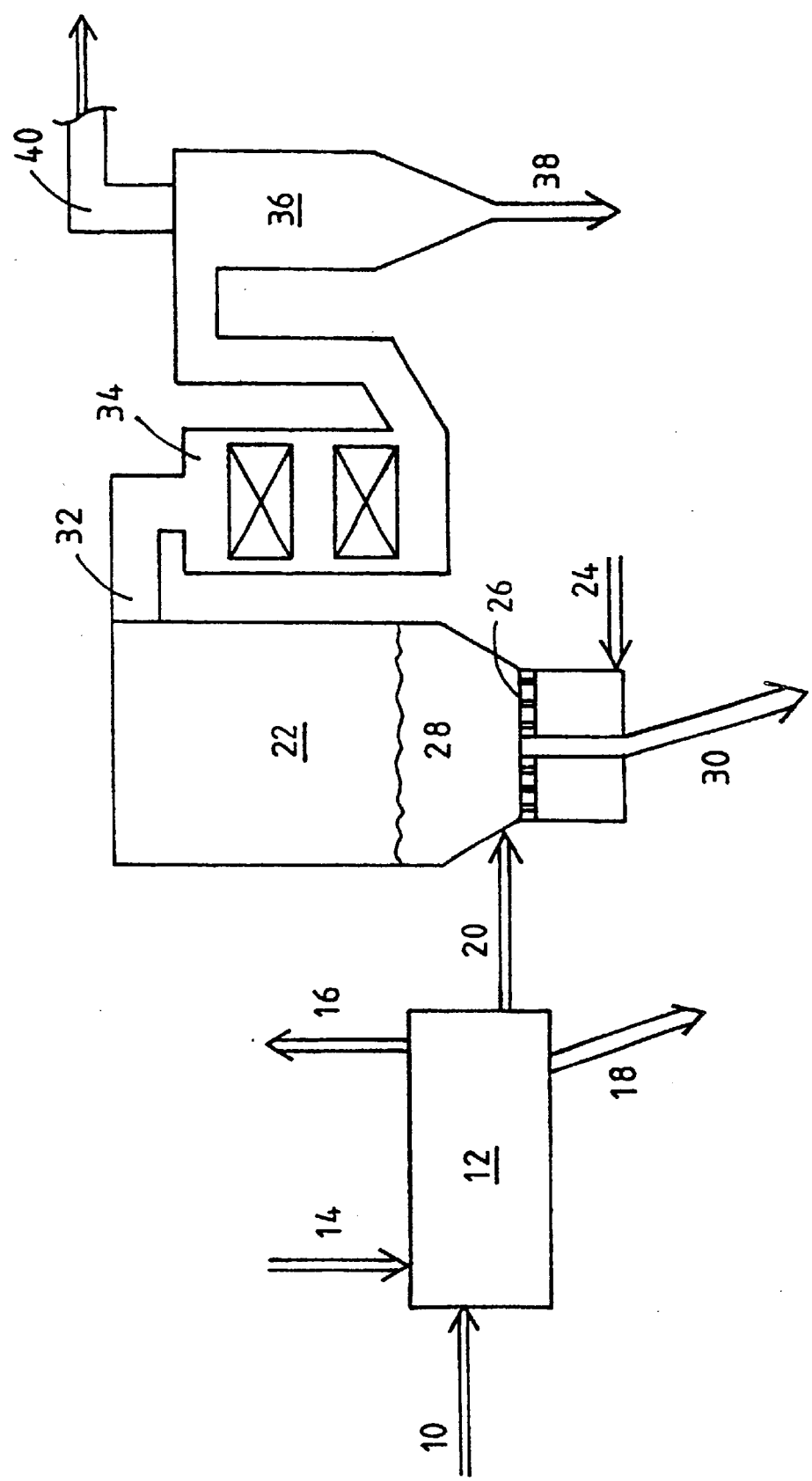

PROCESS FOR RECOVERING METAL MATERIAL FROM WASTE MATERIAL

BACKGROUND OF THE INVENTION

The present invention relates to a process and an apparatus for recovering metal material from waste material including organic material, such as plastic, and metal material in the form of thin foil material.

Many wastes contain valuable materials like metals, glass, paper fibers, wood and plastics. Part of the valuable materials can be rather easily separated from the waste material. E.g., paper fibers can be separated from other waste material by mixing the waste material with water. Fibers mixed with water form an aqueous suspension, which can rather easily be separated from the rest of the waste material.

It is also well known that iron may be separated from waste material by crushing the waste material and separating iron magnetically. Some metal materials may be separated from waste material by combusting the organic material in the waste and recovering metal from the combustion residue.

It is also known to combust waste, as such, in order to recover energy therefrom as thermal energy. It has further been suggested to gasify community waste or other similar waste material for providing useful product gas, which may be used for energy generation.

The combustion of waste material can, however, be difficult, if the content of metals in the waste is high and if the metals have a low melting temperature, e.g., below typical combustion temperatures, e.g., below 1100° C. Such metals are, e.g., Al, Ag, Au, Mg, Pb, Zn and Sn. Molten metals tend to form deposits on surfaces and cause serious fouling in the waste combusting boilers. Alkali salts present in the waste material tend to increase the problem caused by deposits and fouling in combustors.

Many waste materials contain aluminum in a form which may melt already at temperatures of about 670–700° C. Such waste material, if combusted or gasified with air, should, therefore, be treated at temperatures well below the melting point of aluminum present therein, preferably, well below 650° C., in order to avoid problems derived from molten aluminum.

Aluminum dust may be a very hazardous component in any combustion process. Aluminum, if oxidized, may form locally very high temperatures, such as temperatures above 2000° C., or even almost 3000° C. Such high local temperatures in combustors can cause severe damage to the combustor. Further, aluminum in dust form is an explosive material when mixed with air. Also, metallic aluminum may react with alkali hydroxide, e.g., present in fly ash, and form aluminum hydroxide and hydrogen gas. It is well known that hydrogen gas under certain conditions may easily form explosive gas mixtures. Also, storage of fly ash with aluminum may cause problems as formation of hydrogen gas in the fly ash may continue for a long time in its dumping place.

However, many waste materials originating from the packing and insulation industry, electronic devices or components, or car demolition wastes contain such amounts of low melting metals that recovery of these is of high interest. Circuit boards, for instance, include thin foils of particularly valuable metals. E.g., etiquettes, on the other hand, contain considerable amounts of metal foils. Often, the metal is in the form of thin metal foils, the thickness usually being between 5–50 $\mu$m, which renders a mechanical separation of the metal almost impossible.

The present invention sets out to provide an improved process for recovering metal material from waste material and an improved apparatus therefor, which overcomes drawbacks discussed above.

It is also an object of the present invention to provide a process and an apparatus for recovering metal material from waste material in which the heating value of plastic material present in the waste material is recovered in an optimum way.

It is a further object of the present invention to provide a process and an apparatus for recovering metal material from waste material in which metal, such as aluminum, present in the waste material, may be recovered in an optimum form.

It is a still further object of the present invention to provide a process and an apparatus for recovering metal material from waste material at a relatively low temperature, at which many problems arising from high temperatures can be avoided.

The present improved process and apparatus for recovering metal material from waste material thereby are characterized by what is more closely stated in the claims.

Thereby, a typical process for recovering metal from waste material including organic material, such as plastic, and metal material in the form of thin foil material, includes the following steps:

(a) introducing the waste material from which metal is to be recovered into a fluidized bed gasifier, for gasification of the organic material, and (b) separating metal material from gas produced in step (a).

Correspondingly, a typical apparatus for recovering metal from waste material includes a fluidized bed gasifier with a fluidized bed of solids therein, for gasification of the organic material in the waste material from which metal is to be recovered, and a separator for separating metal material from gas produced in the gasifier.

Typically, metal, such as Ag, Al, Au, Mg, Pb, Zn and/or Sn, present as thin metal foils in waste material may be recovered according to the present invention. The foil material may have a thickness of about 5–50 $\mu$m. In the fluidized bed, in the gasifier, the thin foil material is torn into small flakes. The actual gas velocity in the fluidized bed is to be set such that the metal flakes are entrained with the gas up to the gas outlet, but the not yet gasified waste material and bed particles stay in the bed. A slowly fluidized, bubbling fluidized bed, having a gas velocity <2 m/s, typically 0.5–1 m/s, may be used. The bed typically consists of inert solid particles having a mean diameter of about 0.5 to 2 mm, typically about 1 mm.

In waste material, the metal foils are generally more or less permanently combined to some organic material, such as plastic or paper. If the waste includes polyethylene or other plastic material, which does not contain chlorine, the waste material can rather easily be gasified with air. Polyethylene has a high heating value and consists of almost 100% volatiles, which can almost totally be converted to gases and vapors in an air blown gasifier at temperatures well below the melting temperature of any aluminum present. The plastic material is thereby a very valuable fuel. A combustible gas having a high heat value of about 7–15 MJ/m$^3$, typically 9–10 MJ/m$^3$, may be produced in the gasifier. The gas can be used in power production or other processes utilizing combustion heat.

The temperature in the gasifier is typically maintained closed to, but just below, the melting temperature of the metal material to be recovered from the gas produced in the gasifier. The temperature thereby typically is kept below 1100° C. Gasification of plastic material usually takes place at a temperature <650° C. Gasification of polyethylene can take place at a temperature of about 400–550° C.

The gas produced in step (a) is typically cooled and heat energy is recovered therefrom before the metal material is separated from the gas.

If metal materials having very low melting temperatures, e.g., 200–400° C., are to be gasified in the gasifier, then the gasification may have to be done at a higher temperature than the melting temperature of the metal. In such cases, the gas produced will include molten metal particles. The gas may be cooled in a fluidized bed gas cooler, in which the gas produced and molten particles entrained therein are mixed with cooled particles. The molten metal particles contact cooled particles and are rapidly cooled to a temperature below their melting temperature, whereafter they can be separated from the gas.

If the organic material gasified in the gasifier includes Cl, i.e., if PVC plastic material is gasified, then the produced gas can be washed after cooling to separate HCl from the gas.

The waste material from which metal is to be recovered may be pretreated by crushing and/or washing. Coarse, heavy, solid impurities may be separated from the uncrushed or crushed waste material prior to introduction of the waste material into the gasifier. Thus, e.g., iron may be separated mechanically or magnetically from plastic material and light-weight aluminum material. Heavy solid impurities typically originate from iron scrap, refractory material or metal straps used to bind the waste material into bales.

Most heavy impurities are, as discussed above, separated from the waste material before it is introduced into the gasifier. Some heavy metal material may, however, still remain in the material introduced into the gasifier. Such remaining heavy metal impurities will be discharged from the gasifier together with bottom ash, being discharged from the bottom of the gasifier. Impurities originating from heavy metal scrap or the like is too heavy to be entrained by the upward gas flow in the gasifier and is, therefore, not mixed into the product gas and the light metal material fraction is discharged from the top of the gasifier.

Crushed or possibly uncrushed waste material may be washed or soaked in water or solvent for dissolving soluble components, such as alkali salts or other harmful components. Soluble components may thus be separated from the waste material prior to introduction of the waste material into the gasifier. Thus, e.g., alkali salts may at least partly be removed from the waste material prior to introduction thereof into the gasifier. Also, recoverable fiber material present in the waste material may be removed by washing or slushing of the waste material, prior to the introduction into the gasifier.

A conventional separator, such as a centrifugal cyclone, may be arranged downstream of the gasifier for separating the metal material being discharged from the gasifier with the gas produced in the gasifier.

The present invention provides a recycling process in which the light metal fraction of the waste material may be separated from organic material without thereby simultaneously separating and mixing into the light metal fraction other metal material or other heavy impurities possibly present in the waste material.

BRIEF DESCRIPTION OF THE DRAWING

The present invention will now be described in more detail in accordance with the enclosed FIGURE showing schematically a process according to the invention.

DESCRIPTION OF THE PREFERRED EMBODIMENT

Waste material 10 is introduced into an optional pretreatment apparatus 12, such as a washer and/or crusher. During the pretreatment, the waste material may be mixed with water 14 or other liquid for, e.g., separating alkali salts or fibers from the waste material. Liquid introduced into the pretreatment apparatus is discharged through outlet 16. Heavy impurities, such as iron scrap, may be discharged through another outlet 18.

The pretreated waste material is conveyed through channel 20 into a gasifier 22. Gasification air 24 is introduced into the gasifier through bottom grid 26 for fluidizing a bed 28 of solid particles therein. Bottom ash and heavy impurities are discharged from the bed 28 through an outlet 30 connected to an opening in the grid 26.

Gas produced in the gasifier is discharged through an outlet 32 in the top of the gasifier. Thin metal flakes released from the waste material during gasification are entrained by the gas flowing upward in the gasifier and discharged through outlet 32 as well.

The gas flow is conveyed through a gas cooler 34. Heat may be utilized in, e.g., power production (not shown). The cooled gas is introduced into a centrifugal cyclone 36. The thin flakes or particles of metal material are separated from the gas in the cyclone. Metal is discharged through outlet 38 and cleaned gas through outlet 40. The clean gas may be used in power production or any other process utilizing combustion heat.

The following advantages may be achieved with the process shown in the drawing:

Washing of the waste material before introduction into the gasifier removes solvable alkali salts, which usually are causing problems in thermal processes, such as gasification. Problems, such as corrosion, deposits on surfaces, fouling and emissions from the thermal process may be minimized.

Washing also allows for the separation of larger metal pieces from the waste material, thus providing a rather clean fuel for the gasification.

The process also allows, e.g., plastic to be gasified at a relatively high temperature, at which the degree of carbon conversion (in plastic) to gas is high.

When operating at a temperature below the melting point of metal to be recovered, many problems in the gasification and gas cleaning can be avoided. The temperature in the gasification process can be controlled in a very accurate way and it is, therefore, possible to operate the gasifier very close to the melting point of the metal and to avoid problems emanating from the metal melting. It is also possible to produce a gas, which contains low amounts of ungasified carbon.

As the soot content in the gas flow is low, the metal flakes separated from the gas are almost free of carbon and can easily be recovered for metal production.

The present invention should not be limited to only cover the specific application described above. The present invention is, on the contrary, intended to provide protection for the present invention as broadly as defined by the appended claims.

We claim:

1. A process for recovering metal material from waste material that includes organic material and metal material in the form of thin foil metal material, the process including the following steps:

introducing the waste material into a fluidized bed gasifier;

introducing air through a bottom grid into the gasifier for fluidizing a bed of solid particles in the gasifier, for gasification of the organic material therein and production of a combustible gas;

discharging separately from the gasifier bottom ash and combustible gas produced in the gasification step;

maintaining the temperature in the gasifier below the melting temperature of the metal material;

tearing the thin foil metal material into small metal flakes in the fluidized bed;

setting the velocity of the air in the fluidized bed such that the metal flakes are entrained with the produced combustible gas, but the not-gasified waste material and the bed particles stay in the bed;

discharging the metal flakes from the gasifier together with the combustible gas; and introducing the combustible gas discharged from the gasifier into a separator, for separating metal material from the combustible gas.

2. A process according to claim 1, further comprising cooling the produced combustible gas and recovering heat energy therefrom before separating metal material therefrom.

3. A process according to claim 1, wherein the gasification of the organic material takes place at a temperature below 1100° C.

4. A process according to claim 1, wherein gasification of plastic material in the introduced waste material takes place at a temperature of about 550 to about 650° C.

5. A process according to claim 1, wherein gasification of polyethylene in the introduced waste material takes place at a temperature of about 400 to about 550° C.

6. A process according to claim 1, further comprising a pretreatment step of crushing waste material from which metal is to be recovered, prior to introduction of the waste material into the gasifier.

7. A process according to claim 6, further comprising separating coarse heavy metal components from the crushed waste material prior to introduction of the waste material into the gasifier.

8. A process according to claim 1, further comprising washing crushed waste material in water or solvent for dissolving soluble components, and separating the soluble components from the waste material prior to introduction of the waste material into the gasifier.

9. A process according to claim 8, wherein the soluble components are alkali salts.

10. A process according to claim 1, further comprising washing the crushed waste material in water or solvent for slushing and separating slushable components from the waste material prior to introduction of the waste material into the gasifier.

11. A process according to claim 10, wherein the slushable components are fibers.

12. A process according to claim 1, further comprising recovering at least one of Al, Ag, Au, Mg, Pb, Zn and Sn foil material from the waste material.

13. A process according to claim 1, further comprising recovering foil material having a thickness of about 5 to about 50 $\mu$m.

14. A process according to claim 1, further comprising forming in the gasifier a bubbling fluidized bed of solid particles, the particles having a size of about 0.5 to 2 mm, and fluidizing the bed with a fluidization velocity of less than 2 m/s.

15. A process according to claim 14, wherein the bed is fluidized with a fluidization velocity of about 0.5 to about 1 m/s.

16. A process according to claim 1, further comprising discharging heavy impurities from the gasifier with the gasifier bottom ash.

17. A process according to claim 16, wherein the heavy impurities are iron material.

18. A process according to claim 1, wherein the produced combustible gas has a high heat value of about 7 to about 15 $MJ/m^3$ for use in power production or other processes utilizing combustion heat.

19. A process according to claim 18, wherein the bed is fluidized with a fluidization velocity of about 0.5 to about 1 m/s.

20. A process according to claim 1, further comprising recovering metal material from components including at least one of circuit boards, car demolition components, insulation material, packing material and etiquettes.

21. A process according to claim 1, further comprising recovering metal material from electronic devices.

22. A process according to claim 1, wherein the organic material in the waste material includes plastic.

* * * * *

UNITED STATES PATENT AND TRADEMARK OFFICE
CERTIFICATE OF CORRECTION

PATENT NO. : 6,409,798 B1
DATED : June 25, 2002
INVENTOR(S) : Jorma Nieminen et al.

It is certified that error appears in the above-identified patent and that said Letters Patent is hereby corrected as shown below:

<u>Title page,</u>
Item [86], the § 371 (c)(1), (2), (4), Date reads "March 13, 2001" and should read -- March 27, 2001 --.

Signed and Sealed this

Third Day of June, 2003

JAMES E. ROGAN
*Director of the United States Patent and Trademark Office*